(No Model.)  2 Sheets—Sheet 1.

C. E. NEWMAN.
SPRING PROPELLED VEHICLE.

No. 502,577. Patented Aug. 1, 1893.

Witnesses
Amy H. Johnson
Edwin L. Bradford

Inventor
Charles E. Newman
By Johnson & Johnson
his Attorneys (No Model.) 2 Sheets—Sheet 2.
C. E. NEWMAN.
SPRING PROPELLED VEHICLE.
No. 502,577. Patented Aug. 1, 1893.
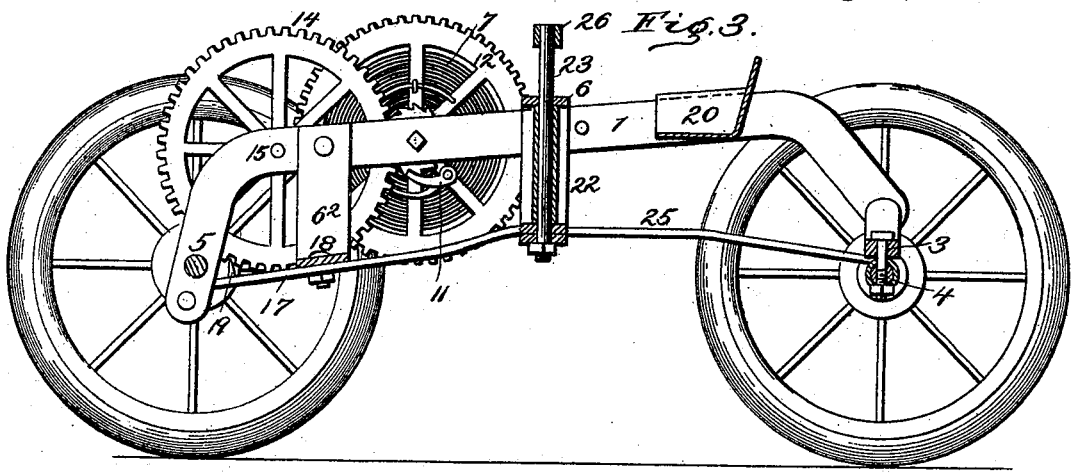
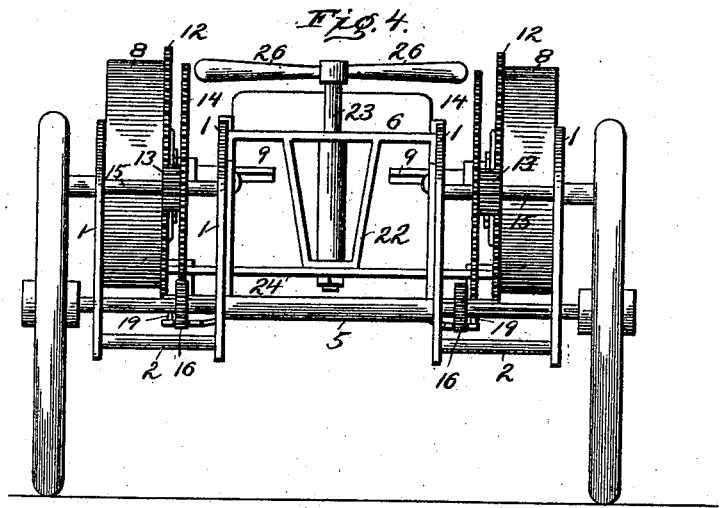
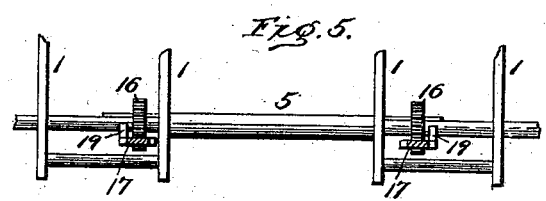
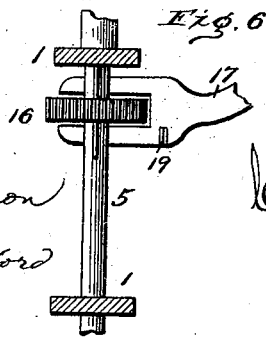
Witnesses
Guy H. Johnson
Edwin L. Bradford
Inventor
Charles E. Newman
by Johnson & Johnson
his Attorneys

UNITED STATES PATENT OFFICE.

CHARLES E. NEWMAN, OF BALTIMORE, MARYLAND.

SPRING-PROPELLED VEHICLE.

SPECIFICATION forming part of Letters Patent No. 502,577, dated August 1, 1893.

Application filed April 21, 1893. Serial No. 471,333. (No model.)

*To all whom it may concern:*

Be it known that I, CHARLES E. NEWMAN, a citizen of the United States, and a resident of the city of Baltimore and State of Maryland, have invented certain new and useful Improvements in Spring-Propelled Vehicles, of which the following is a specification.

My invention is directed to improvements in spring propelled vehicles of the type known as velocipedes; and my said improvements consist of certain novel constructions and combinations, whereby the frame contains separate and independent devices controlled by the feet of the rider for engaging and disengaging the propelling shaft with spring motors, and for locking the same when out of engagement. These improvements I will now describe and will particularly point out in the claims concluding this specification.

Figure 1:
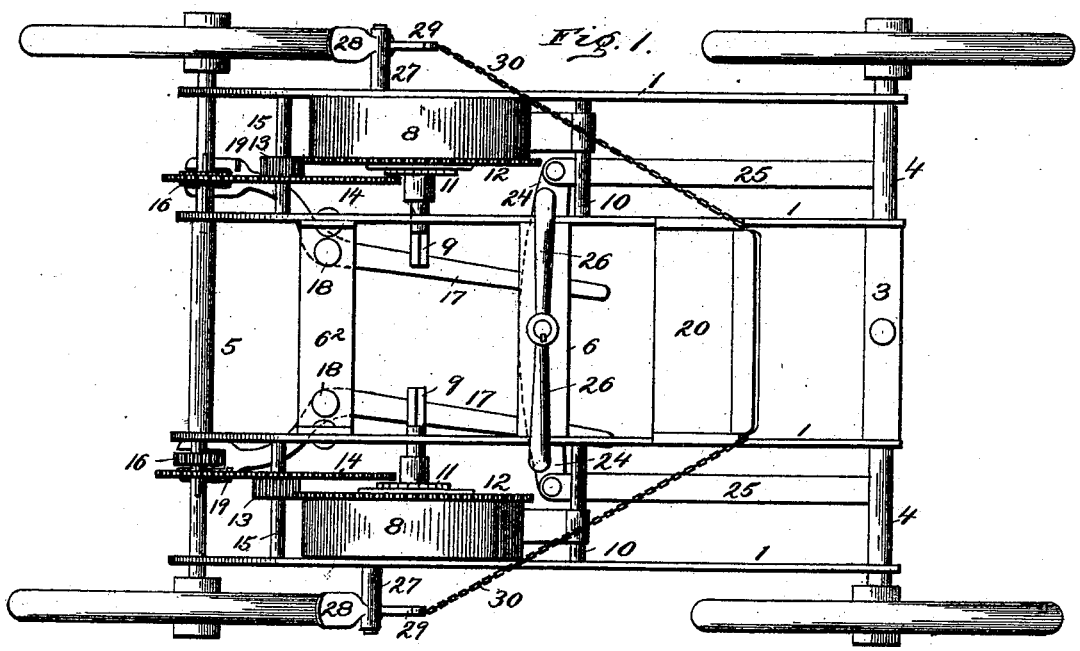
Figure 2:
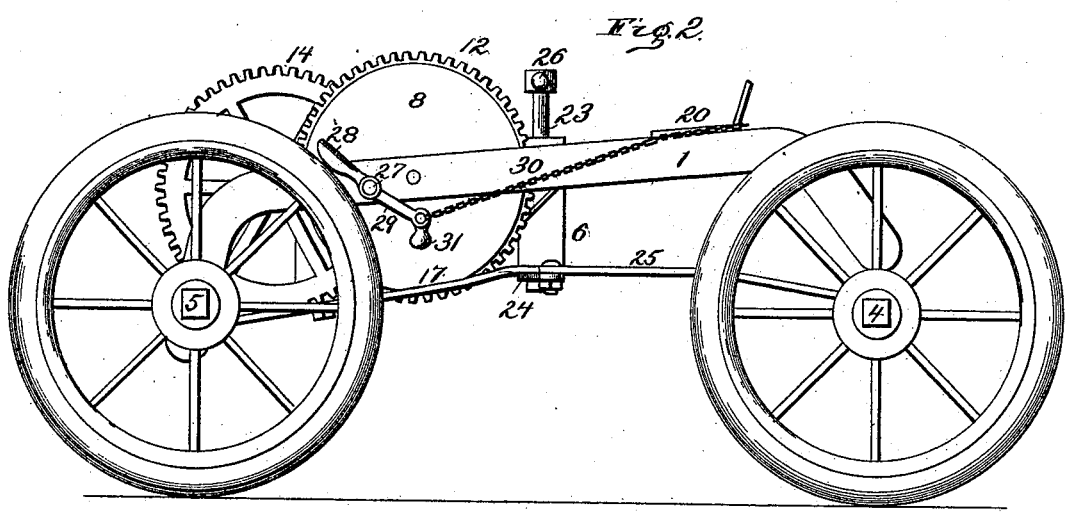

The accompanying drawings illustrate my improved spring propelled vehicle, wherein, Figure 1 is a top view and Fig. 2 is a side view of the same. Fig. 3 is a vertical longitudinal section, and Fig. 4 is a front view; and Figs. 5 and 6 show details of the motor locking device, Fig. 6 being a top view and Fig. 5 a front view.

The frame consists of four bars 1, 1, 1, 1, bent down at each end and connected in pairs so as to form two parallel side frames. At their front ends they are connected by studs 2, 2, and at their rear ends by the bolster bar 3, to the center of which the rear steering axle 4 is suitably clipped. The front axle 5, is mounted to turn loosely in the ends of the side frames just above their connecting studs. The side frames are connected to each other by angle plates 6, 6², one in the middle and one at the front. The wheels I prefer to make of the bicycle type. Each of the side frames has one or more spring motors mounted therein, the springs 7 whereof are suitably carried in drums 8 fixed to the frames.

9 are the winding stems for the springs and 10 are studs by which the springs are connected to the frames. Each winding stem has the usual ratchet and pawl device 11 and driving gear 12.

The power transmitting gear consists of a pinion 13 and a gear 14 on a stud 15 mounted in each side frame in front of the spring containing drum and a pinion 16 fitted to slide upon the front axle and when engaged with the gear 14, drives said front axle 5 and propels the vehicle. The axle pinions are fitted to slide thereon by a feather, so that the pinions may drive the axle when engaged with the motor train and be shifted to disengage the motor train. This allows both or either of the motors to be used, so that while one is in use the other may be wound up. The provision for effecting this consists of a foot lever 17 pivoted at 18 to the front angle plate 62, and forked at its front to embrace the pinion beneath the axle. A tooth or stud 19 stands up from this end of the lever in such position that when the pinion is shifted out of engagement with the motor gear 14, the tooth will be at one side of and out of engagement with the said motor gear and when the said pinion is shifted out of engagement with said motor gear this tooth or stud will be moved between the teeth of said gear and lock it and hold it while the spring is being wound up, or when it is not desired to propel the vehicle. For this purpose the free ends of the levers extend back to near the rider's seat 20, so that by his feet he can shift the levers sidewise, as he may desire to engage or disengage one or both of the axle pinions with the spring motors.

The rider's seat 20 is mounted upon the inner bars of the side frames in such a manner as to have a back and forth sliding movement thereon in the rear of the center angle plate 6. A bracket or hanger 22 depends centrally from this angle plate and with the latter supports a steering post 23, to the lower end of which is rigidly secured a cross bar 24, upon which rests the handles of the pinion shifting levers. The ends of this steering post cross-bar connect by rods 25 with the rear steering axle, by which the rider directs the machine.

The cross bar of the steering post while forming a rest for the handles of the gear shifting levers, also forms a foot rest for the rider so that he can steer the machine by his feet pushing upon either arm of this cross-bar, or by his hands controlling the handles 26 of the steering post.

I utilize the sliding function of the seat as a means of applying and releasing the brakes for the vehicle, and for this purpose I use a lever brake mounted on a stud 27 projecting from the side frames, so that the shoe ends 28 will stand over the front wheels and the lever ends 29 will be connected together by a chain or cord 30 which is loosely connected to the sliding seat, so that its movement will apply or release the brakes. A simple way of making such connection is by passing the brake cord around the back of the seat as shown, but its connection with the latter must be such as to allow the pulling action on the cord by the seat to be equal upon both brake-levers to give equal pressure of both brake shoes upon the wheels. In doing this the rider pushes his body against the back of the seat and forcing the latter back on its frame ways, applies the brakes with a force regulated by the pressure with which he presses against the seat. To release the brakes the seat is moved forward, and the lever end of the brake being weighted at 31, as shown in Fig. 2, the shoe will be held out of contact with the wheel.

In applying the brakes the rider exerts pressure to force the seat back, by pushing with his feet upon the cross bar of the steering post, and thus both steer the machine and apply the brakes by his feet at the same time; while at the same time he can use his feet to engage or disengage one or both of the motor controlling levers. In these particulars my improvements give the rider complete control of the machine by his feet, to propel it, to stop it, and to direct it.

The arrangement of the pinions on the front axle and the provision by which they are shifted thereon give the advantage of applying the power direct to the front axle at points between the side frames where the latter are mounted upon the axle and braced to it. The construction of the frame of wrought iron bars bent and connected as shown, gives great strength and stiffness to the structure, and a very convenient way of mounting the spring drums and their driving train.

In self propelled vehicles it is important to both direct and to stop it at any point, and to release it and to engage it with the spring power, and these things I effect by the co-operation of the sliding seat, the brakes, the steering device, and the shifting levers, all of which for these purposes being under the direct control of the rider.

It is obvious that the train may be locked to the frame instead of by the shifting lever, but I prefer the way shown because the same action of the lever which controls the shifting of the pinion also controls the action of the locking device. When one spring power has been exhausted it is disengaged from the pinion of the propelling shaft and locked with the shifting lever tooth or stud as seen at $a$ in Fig. 4, while the spring is being again wound up while the other motor is in use, and in this way each spring is an auxiliary power.

The way in which I use the foot rest steering bar and the motor shifting levers, makes it convenient to support the latter on the foot-rest so that the rider may use his feet for either purpose.

I claim as my improvement—

1. In a self propelled vehicle, the combination, with the frame, of a sliding seat, the brakes operated thereby, a steering device, a pair of shifting levers, each controlling a pinion on the front axle, and a train of gear engaging each pinion and an independent spring motor, arranged and controlled by the rider, substantially as described.

2. In a self propelled vehicle, the combination, with the duplex spring motors, of the front axle having a sliding pinion thereon for each motor, a train of gear separately engaging said pinions and spring motor, and a pair of levers for independently shifting said pinions, having each a tooth or stud adapted to engage and disengage the said separate motor trains, substantially as described.

3. In a self propelled vehicle, the combination of the frame composed of the separate side bars mounted in pairs at their rear ends upon the bolster and at their front ends upon a driving axle, a spring motor and gear train mounted in each frame, a pinion sliding on said axle for engaging each train, a foot lever for engaging each pinion, and a tooth or stud on each lever for engaging each motor train, substantially as described.

4. In a spring propelled vehicle the front axle having near each end a sliding pinion, in combination with a spring propelled gear train, suitable means for separately shifting said pinions to engage and disengage said motor train and suitable means for separately locking said gear train when disengaged from said pinion, substantially as described.

5. In a self propelled vehicle, the combination, with the front axle having sliding pinions, an independent spring driven motor train engaging each pinion, a shifting lever for each pinion, and the steering cross bar supporting said levers, substantially as described.

In testimony whereof I have hereunto signed this specification in the presence of witnesses.

CHARLES E. NEWMAN.

Witnesses:
J. M. HALEY,
H. VAUGHAN.